(12) United States Patent
Dunne

(10) Patent No.: US 7,699,192 B2
(45) Date of Patent: Apr. 20, 2010

(54) DISCHARGE DEVICE WITH A METERED DOSE VALVE

(75) Inventor: Stephen Terence Dunne, Stowmarket (GB)

(73) Assignee: Boehringer Ingelheim microParts GmbH, Dortmund (DE)

( * ) Notice: Subject to any disclaimer, the term of this patent is extended or adjusted under 35 U.S.C. 154(b) by 838 days.

(21) Appl. No.: 10/596,396

(22) PCT Filed: Dec. 3, 2004

(86) PCT No.: PCT/EP2004/013761

§ 371 (c)(1),
(2), (4) Date: Aug. 10, 2006

(87) PCT Pub. No.: WO2005/059480

PCT Pub. Date: Jun. 30, 2005

(65) Prior Publication Data

US 2007/0062979 A1      Mar. 22, 2007

(30) Foreign Application Priority Data

Dec. 10, 2003    (GB) ................................ 0328564.0

(51) Int. Cl.
*B67B 1/00*    (2006.01)

(52) U.S. Cl. .............................. 222/153.11; 222/402.2
(58) Field of Classification Search .............. 222/402.2, 222/402.11, 153.11, 153.12, 153.04, 153.13
See application file for complete search history.

(56) References Cited

U.S. PATENT DOCUMENTS

| 3,050,219 | A | * | 8/1962 | Sagarin et al. | ......... | 222/402.11 |
| 4,220,258 | A | | 9/1980 | Gruenewald | | |
| 4,688,946 | A | | 8/1987 | Latif et al. | | |
| 4,875,605 | A | | 10/1989 | Weston | | |
| 5,632,421 | A | * | 5/1997 | Colombo | ................. | 222/402.2 |
| 6,273,304 | B1 | * | 8/2001 | Hoshino | ................. | 222/402.2 |

FOREIGN PATENT DOCUMENTS

WO      WO 03/051522 A2    6/2003

* cited by examiner

*Primary Examiner*—Kevin P Shaver
*Assistant Examiner*—Jonathan Wood
(74) *Attorney, Agent, or Firm*—David S. Safran; Roberts Mlotkowski Safran & Cole, P.C.

(57) ABSTRACT

A discharge device with a metered dose valve is proposed. The metered dose valve comprises an inlet valve, a metering chamber and an outlet valve. In order to allow discharge of fluid from the metering chamber in multiple steps, a user can depress and release an actuation member multiple times in a selected discharge state wherein refill of the metering chamber with new liquid is prevented.

15 Claims, 10 Drawing Sheets

DISCHARGE DEVICE WITH A METERED DOSE VALVE

BACKGROUND OF THE INVENTION

1. Field of the Invention

The present invention relates to a discharge apparatus with a metered dose valve for metered discharge of a pressurized liquid, wherein the metered dose valve has a valve element and a metering chamber with an associated inlet valve and an associated outlet valve, wherein the outlet valve is closed and the inlet valve is open in a first position of the valve element so that the liquid can fill the metering chamber with a metered dose, and wherein the outlet valve is open and the inlet valve is closed in a second position of the valve element so that the liquid is discharged from the metering chamber to the atmosphere

2. Description of Related Art

In particular, the present invention deals with a discharge device with a metered dose valve for use with pressurized aerosol packs, containers or the like, where a liquid product is pressurized by a liquefied or compressed gas or a solid product is suspended in a liquefied gas but is not limited to such packs.

Many pressurized aerosol packs contain a metered dose valve that accurately measures a single dose of the product within the pressurized reservoir. Such valves are used in many applications including, for example, for delivering accurate amounts of a drug to a patient or animal. Generally, the metered dose valve dispenses the total dose when it is opened with the user having no control over how much of the metered dose is delivered. In most cases, this is an important aspect of the valve as, for instance, in the case of medical inhalers, it is important that the patient receives no less or no more than the appropriate metered dose. Generally, such metered dose valves are operated by depressing an actuator, with finger pressure with the movement stopping only when the open position is reached. The metered dose valve is generally spring loaded so that it returns to the closed position when finger pressure is released. The majority of such metered dose valves contain an inlet valve and an outlet valve, usually with cut gaskets. The inlet valve connects the canister liquid reservoir with the liquid to a metering chamber while the outlet valve connects the metering chamber to the atmosphere.

When such valves are actuated by the user, the user is only aware of two positions; closed and open or first and second. In the first position, the inlet valve is open and the outlet valve is closed. In the second position, the inlet valve is closed and the outlet valve is open. When, in the first position, the metering chamber is maintained full of liquid and sealed from the atmosphere, and when in the second position the content of the metering chamber is allowed to flow into the atmosphere while the metering chamber is sealed from the liquid pressurized canister or reservoir.

On the way from the first position to the second position and vice versa, an intermediate position is passed, but the user has no knowledge of this. What the user is unaware of is that there is the intermediate position where both the inlet valve and the outlet valve are closed. This is because to accurately meter the product, i.e., the liquid, the inlet valve must be closed before the outlet valve is opened.

SUMMARY OF THE INVENTION

The object of the present invention is to provide a discharge device that allows a metered dose of liquid to be discharged in more than one step or action, in particular, wherein the discharge can be interrupted and continued.

The above object is achieved by a discharge device in which an intermediate position of the valve element can be selected so that the inlet valve and outlet valve are closed, wherein the valve element can be actuated and moved between the intermediate and the second position so that a metered dose of the liquid can be discharged discontinuously or in more than one actuation of the valve element.

A basic idea of the present invention is that an intermediate position of the valve element can be selected so that both the inlet valve and the outlet valve are closed. By moving or actuating the valve element between the second position and intermediate position, in particular, by depressing and releasing an associated actuation member or the like, a metered dose of liquid contained in the metering chamber can be discharged in more than one step. Thus, the user can discharge the total content or metered dose of the metering chamber in more than one action. This is possible, because the intermediate position can be selected by the user allowing the user to switch to the second position more than once before the total content or dose of the metering chamber is discharged. This is advantageous for some applications.

In connection with the present invention, the term "liquid" has to be understood in a broad sense. In particular, it shall cover all kinds of liquids, fluids, mixtures, suspensions, liquefied gases, or the like that may be discharged by a metered dose valve.

Further aspects, advantages and features of the present invention will be apparent from the following detailed description of preferred embodiments in conjunction with the accompanying drawings.

DETAILED DESCRIPTION OF THE INVENTION

In the figures, the same reference signs are used for the same or similar components, wherein same or similar characteristics or advantages are achieved, even if a repeated discussion is omitted.

Figure 1:
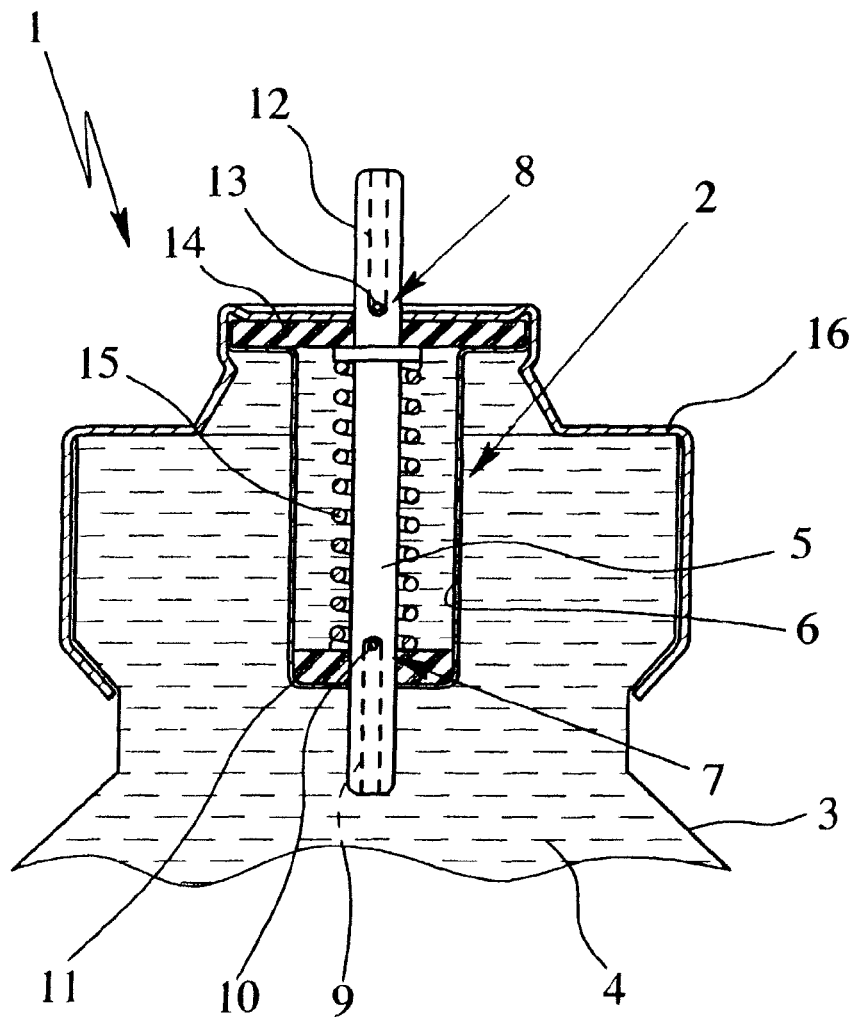
FIG. 1 is a schematic partial section of a discharge device with a metered dose valve according to the prior art in the first position.
Figure 2:
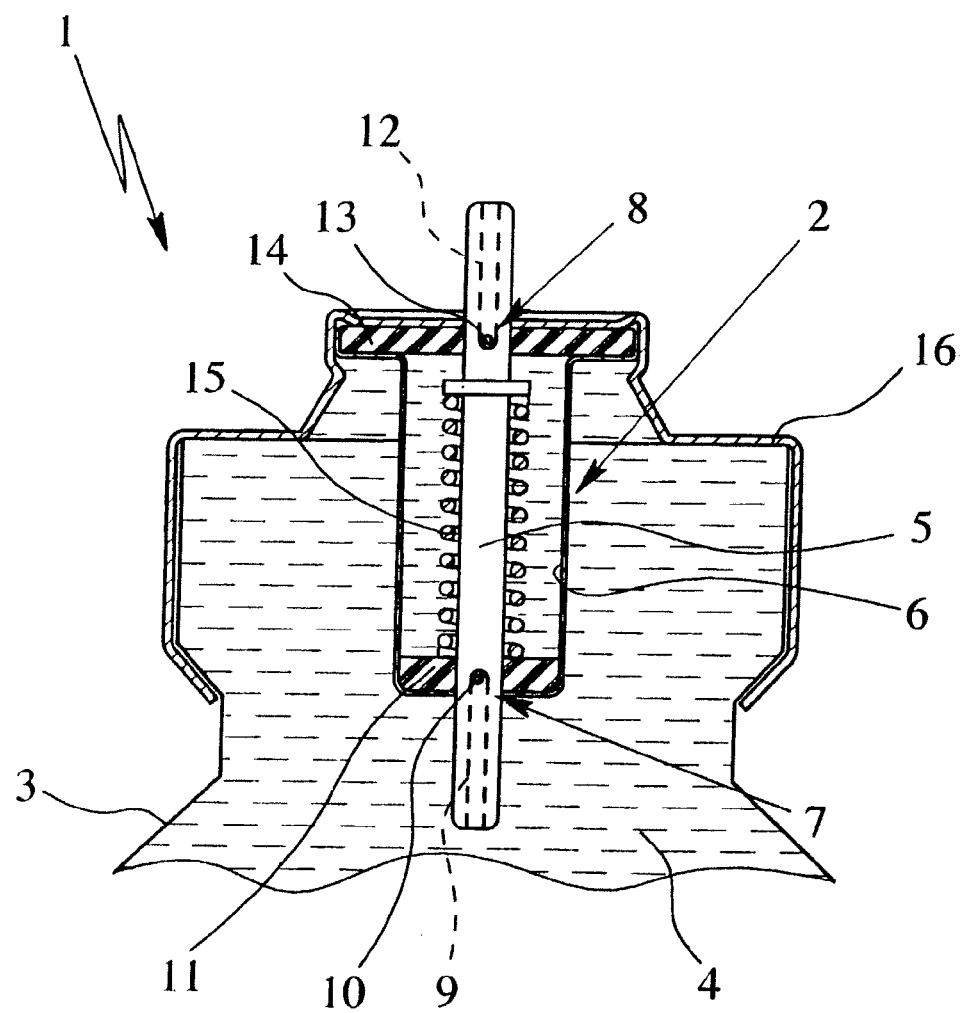
FIG. 2 is a schematic partial section of the discharge device with the metered dose valve according to the prior art in the intermediate position.
Figure 3:
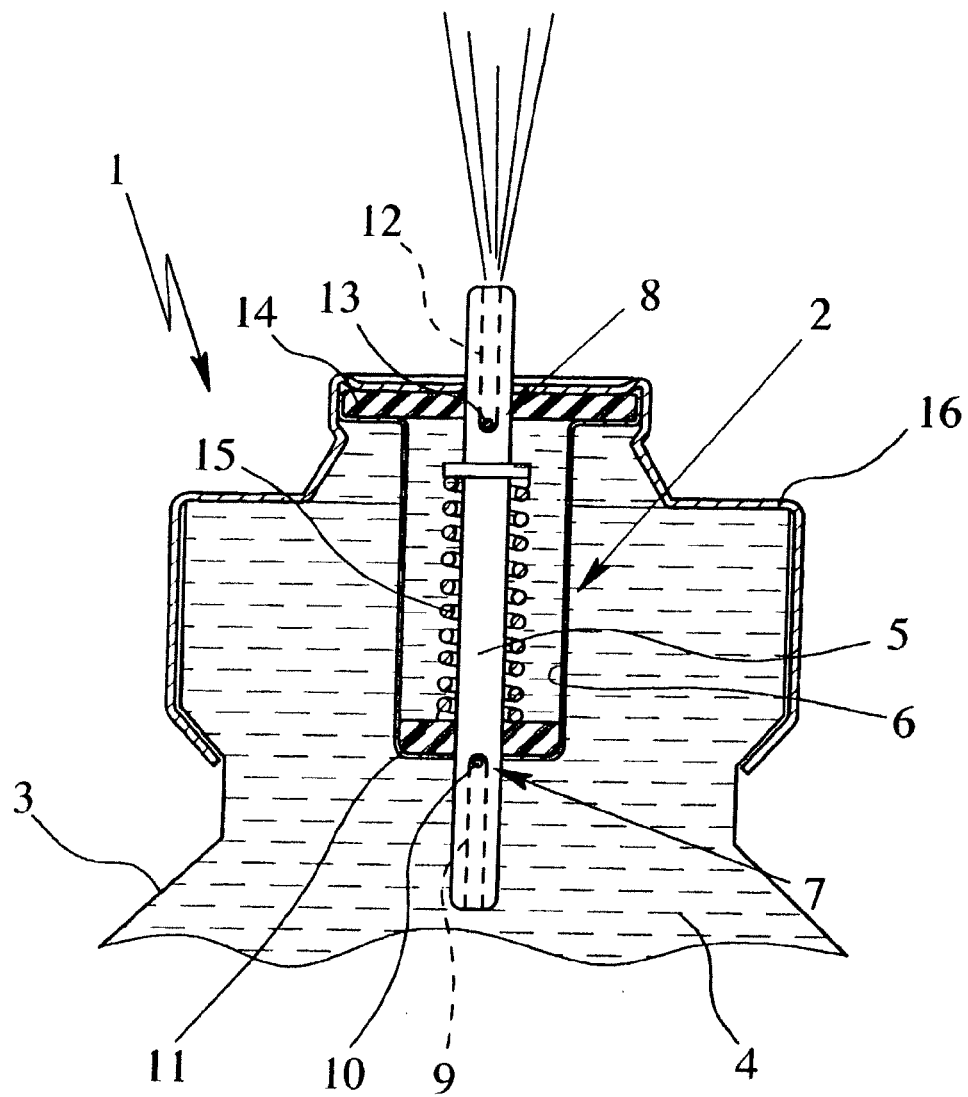
FIG. 3 is a schematic partial section of the discharge device with the metered dose valve according to the prior art in the second position.

FIGS. 1 to 3 show, in schematic partial sections, a discharge device 1 with a metered dose valve 2 according to the prior art.

The discharge device 1 comprises a canister, reservoir or container 3 for pressurized liquid 4. If necessary or desired, the pressurized liquid 4 may be stored in a bag (not shown) in the container 3.

The liquid 4 may be pressurized by a liquefied gas or compressed gas or by any suitable biasing means or any other means. If the liquid 4 is stored in a bag within the container 4, gas may be used in the container 4 and/or in the bag for pressurizing the liquid 4.

The metered dose valve 2 comprises a movable valve element 5 and a metering chamber 6 with an associated inlet valve 7 and an associated outlet valve 8.

The valve element 5 allows actuation of the inlet valve 7 and the outlet valve 8 and preferably forms a part of these valves 7, 8.

The valve element 5 comprises a first axial channel 9 connected with a first radial aperture 10 and passes through a first gasket 11. The inlet valve 7 is formed by the first gasket 11, the first channel 9 and the first aperture 10. In the first position shown in FIG. 1, the aperture 10 opens within the metering chamber 6, i.e., is not covered by the gasket 11 or does not open outside the metered dose valve 2. Thus, the inlet valve 7 is open in this first position so that the liquid 4 can fill the metering chamber 6 due to the pressure in the container 3.

The valve element 5 further comprises at its other end a second axial channel 12 connected with a second radial aperture 13 and passes through a second gasket 14. This second gasket 14, second channel 12 and second aperture 13 form the outlet valve 8. In the first position of the valve element 5 shown in FIG. 1, the aperture 13 is either covered by the gasket 14 and/or opens outside the metering chamber 6, so that the outlet valve 8 is closed. Thus, liquid 4 cannot be discharged from the metering chamber 6 through outlet valve 8 in the first position.

In the present embodiment, the inlet valve 7 and the outlet valve 8 are of the cut gasket type with cross orifices or apertures 10, 13. However, the valves 7, 8 may be constructed in any other suitable manner.

The valve element 5 is biased into the first position. In the illustrated embodiment, the metered dose valve 2 comprises a spring 15 for biasing the valve element 5 in the first or upper position as shown in FIG. 1. Preferably, the spring 15 is located within the metering chamber 6.

In the illustrated embodiment, the valve element 5 or the metered dose valve 2 is mounted by a metal cup 16 to the container 3. In particular, the cup 16 is crimped onto the container 16.

FIG. 2 shows the valve element 8 in a partially depressed position, namely in the intermediate position. In this intermediate position, the inlet valve 7 and the outlet valve 8 are closed simultaneously. In particular, the first and second apertures 10, 13 are respectively covered by first gasket 11 and second gasket 14, respectively. In the intermediate position, the content or metered dose in the metering chamber 6 is isolated from both the container 3 and the atmosphere. However, the user of this state of the art metered dose valve 2 is not aware of this intermediate position during the actuation of the discharge device 1 or metered discharge valve 2, i.e., during the movement of the valve element 5 towards the second position.

FIG. 3 shows the valve element 5 in the second position that is finally reached due to the pressure applied by a user (not shown). In this second position, the inlet valve 7 is closed and the outlet valve 8 is open, so that the content or metered dose of liquid 4 in the metering chamber 6 is discharged to the atmosphere via the second aperture 13, the second channel 12, and preferably a discharge head, tube or the like (not shown). The discharge from the discharge device 1 or its metered dose valve 2 may be in the form of a liquid stream, jet, spray, foam or solid particles or any other form.

When the user releases the pressure on the valve element 5, in particular by releasing an associated actuation member (not shown), the biasing force returns the valve element 5 directly via the intermediate position to the first position, resulting in refilling of the metering chamber 6 with liquid 4. Consequently, the prior art metered dose valve 2 is not suitable to discharge a metered dose of liquid 4 discontinuously or in more than one step or actuation.

In the following, two embodiments according to the present invention will be described with reference to FIGS. 4 to 10, wherein basically only important differences between the embodiment proposed according to the present invention and the discharge device 1 with its metered dose valve 2 of the prior art according to FIGS. 1 to 3 will be emphasized.

According to the present invention, a metered dose of liquid 4 can be discharged discontinuously or in multiple steps from the metering chamber 6. In particular, it is possible to depress and release the valve element 5 alternately in a "discharge state" to discharge the metered dose of liquid 4 as desired, but without refilling the metering chamber 6 with liquid 4 from the container 3 during this alternate actuation. In particular, this kind of actuation is possible because the discharge device 1 or metered dose valve 2 can be switched or set into the so-called discharge state permitting this kind of actuation: In this discharged state, the valve element is moveable only between the second position and the intermediate position alternately, wherein this second position and this intermediate position correspond to the second position and intermediate position, respectively, as described in the introductory part of the description and with regard to the prior art metered dose valve 2.

The metered dose valve 2 can be switched or set also in a "non-discharge state." In this non-discharge state, refilling of the metering chamber 6 with liquid 4 is permitted. In particular, the valve element 5 can return from the intermediate position to the first position allowing refill of the metering chamber 6 with liquid 4. This first position corresponds to the first position mentioned in the introductory part of the description and the one explained with regard to the prior art metered dose valve 2 according to FIGS. 1 to 3. In particular, the valve element 5 returns to the first position upon release due to the biasing force of spring 15.

Preferably, the switching between the discharge state and the non-discharge state and/or vice versa is only possible in the intermediate position.

Preferably, the switching between the discharge state and the non-discharge state and/or vice versa is performed by rotating the valve element 5, an associated actuation member 17, a discharge head, a locking or housing element 18 or the like.

However, the switching or locking mechanism could include, additionally or alternatively, a catch or ratchet mechanism or the like. For example, a release button or the like could be depressed or actuated in order to switch from the discharge state into the non-discharge state without the necessity to rotate or twist any element.

Figure 4:
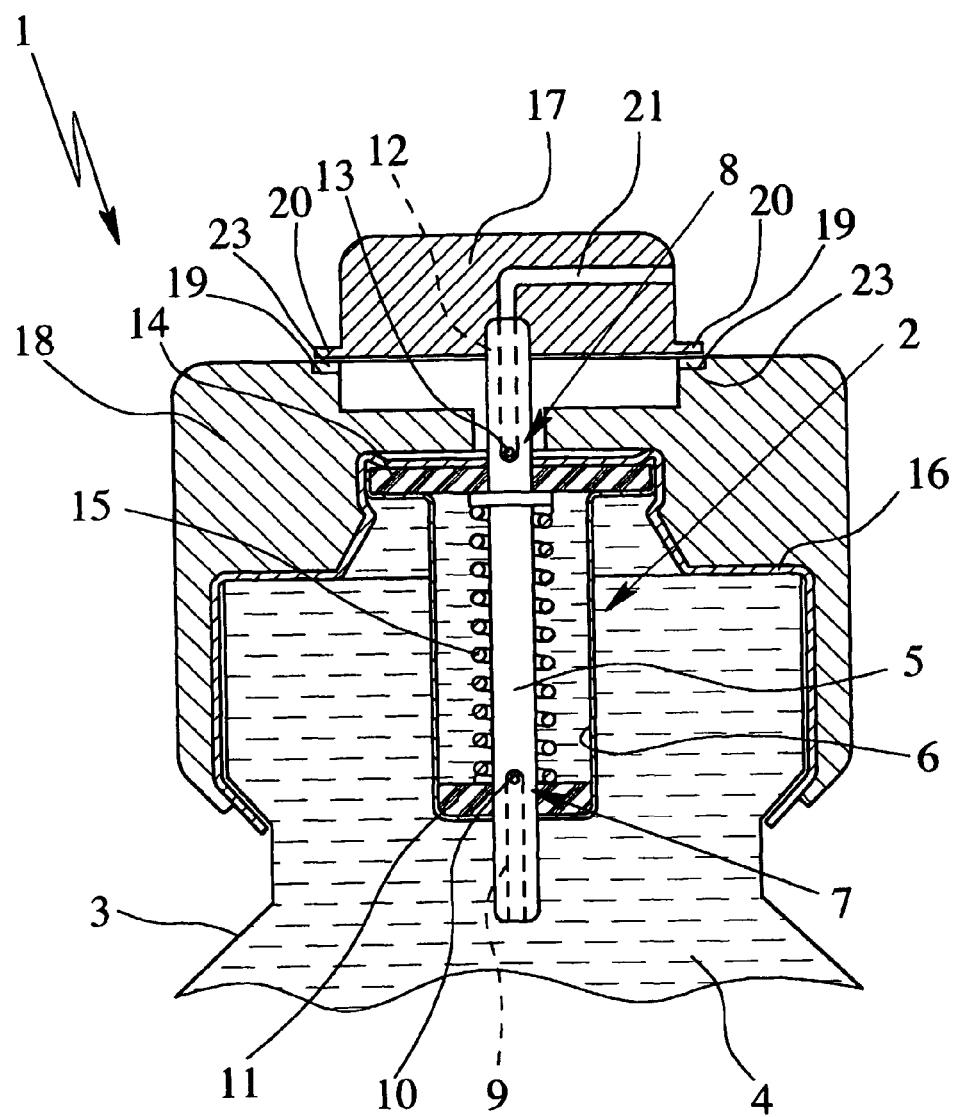
FIG. 4 is a schematic partial section of the discharge device with the metered dose valve according to the first embodiment of the present invention in the first position.
Figure 5:
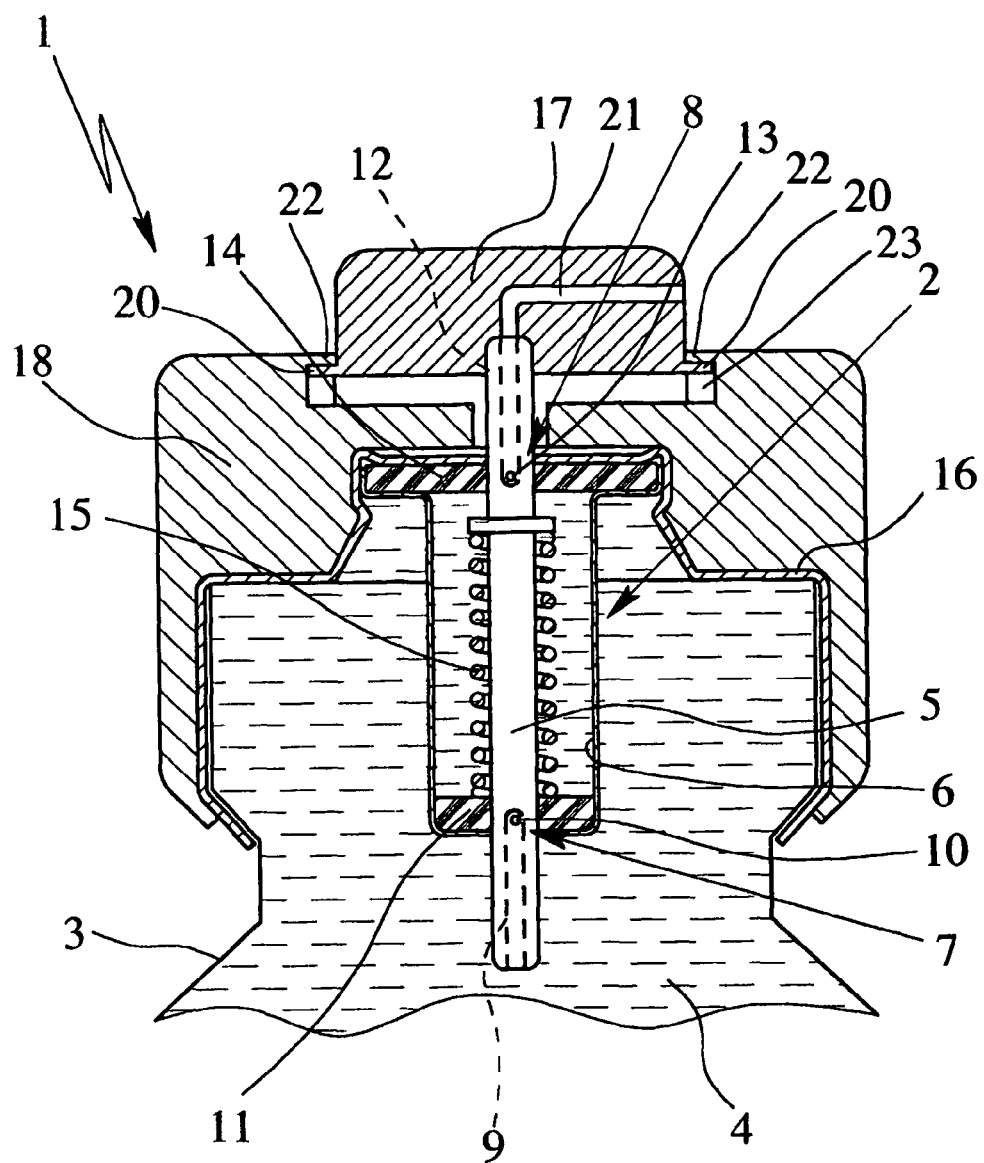
FIG. 5 is a schematic partial section of the discharge device with the metered dose valve according to the first embodiment of the present invention in the intermediate position.
Figure 6:
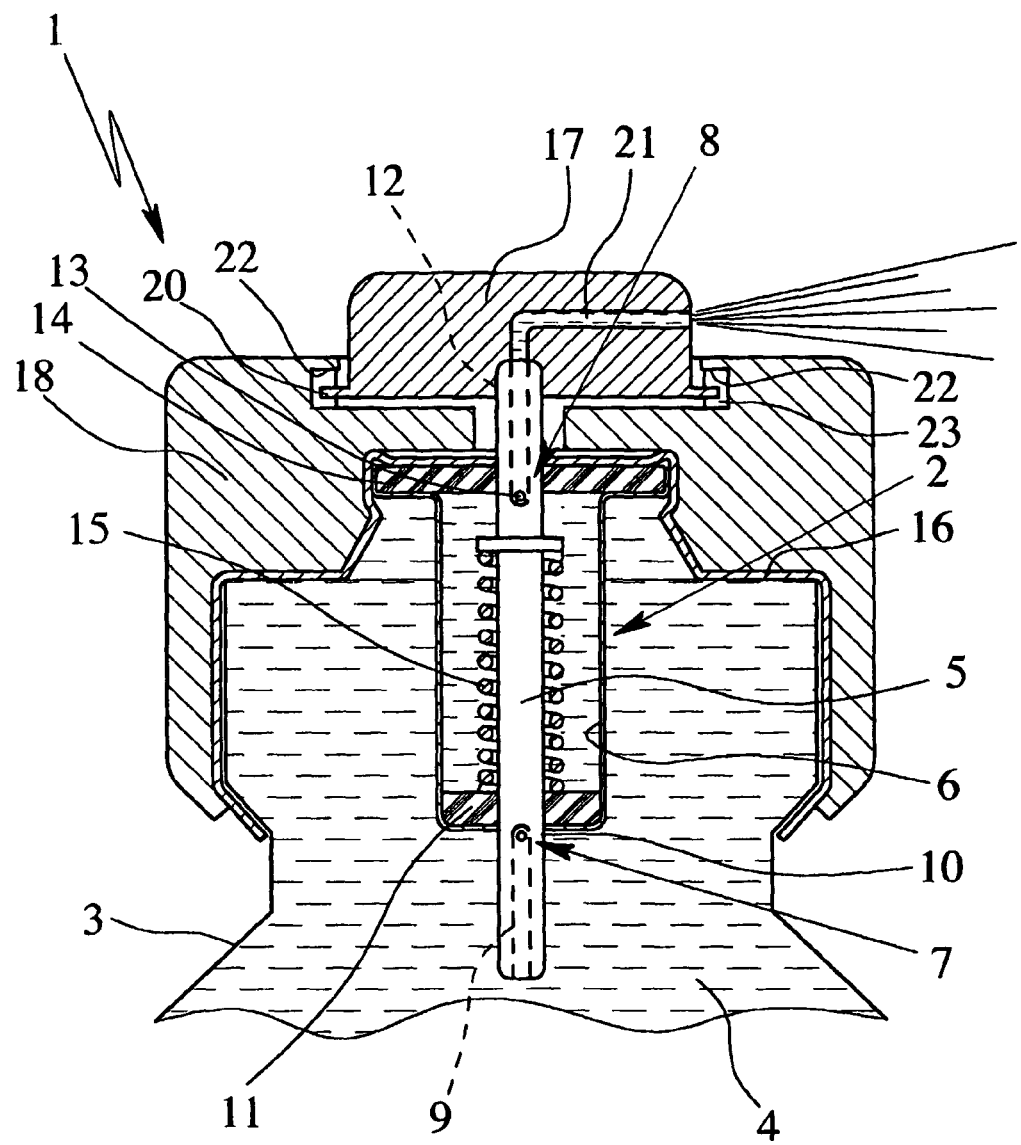
FIG. 6 is a schematic partial section of the discharge device with the metered dose valve according to the first embodiment of the present invention in the second position.

FIGS. 4 to 6 show schematic partial sections of the discharge device with the metered dose valve 2 according to a first embodiment of the present invention.

The actuation member 17, in particular a discharge head or the like, is associated with and preferably mounted on the valve element 5. The discharge device 1 or the metered dose valve 2 further comprises the housing or locking element 18 which cooperates with the actuation member 17 such that the following desired function can be achieved.

Starting with the first position shown in FIG. 4, the actuation member 17/valve element 5 can be manually depressed by a user (not shown) from the first position only until the intermediate position is reached due to a first stop 19. In particular, a preferably protruding portion 20 of the actuation member 17 abuts at first stop 19. This forms a first locking means.

By relative rotation between the actuation member 17 and the locking element 18 in the intermediate position, i.e., in the partly depressed position, the first stop 19 can be bypassed and the first locking means unlocked, respectively, as shown in FIG. 5, and thus, the discharge device is switched from the non-discharge state to the discharge state. It is noted that FIG. 5 is a view taken perpendicular the section of FIG. 4. The axis of rotation of member 17 is preferably parallel to the axis or direction of actuation of the valve element 5.

Then, the user can depress the actuation member 17/valve element 5 further from the intermediate position shown in FIG. 5 to the second position shown in FIG. 6. Then, discharge of liquid 4 starts. The liquid 4 is discharged from the metering chamber 6 through the open outlet valve 8 and an outlet channel 21 in the actuation member 17/discharge head to the atmosphere.

When the user releases the pressure on actuation member 17, the valve element 5 returns to the intermediate position due to the biasing force of spring 15, but is limited in its movement from the intermediate position to the first position by a second stop 22 or second locking means. Thus, reaching of the first position and refilling of metering chamber 6 are prevented in the discharge state, i.e., in the present embodiment in this rotational state of the actuation member 17 relative to the locking element 18. In this state, the actuation member 17 and valve element 5 can be depressed and released alternately multiple times in order to alternate between the intermediate position and the second position to discharge only one metered dose of liquid 4 in multiple steps or discontinuously, as desired.

After complete or partial release of the liquid 4 from the metering chamber 6, the discharge device 1/metered dose valve 2 can be switched or twisted back into its non-discharge state by relative rotation—preferably in the backwords direction—between the actuation member 17 and the housing/locking element 18 to bypass the second stop 22, i.e., to unlock the second locking means.

Then, the valve element 5 will return to its first position after release of the actuation member 17, and the metering chamber 4 will refill with liquid 4 due to the pressure in the container 3 acting on the liquid 4.

According to the present invention, the intermediate position of the valve element 5 can be selected. While in the first position, the second position cannot be selected directly and vice versa.

In the first embodiment according to the present invention, the actuation member 17 is pressed down and rotated relative to the housing or locking element 18 by an angle of about 90° for switching between the discharge state and the non-discharge state and vice versa. However, any other suitable angle is possible. Depending on the structure, it might be necessary to twist in opposite directions for switching to the discharge state and non-discharge state, respectively. However, it might also be possible to twist in the same direction in both cases.

Figure 7:
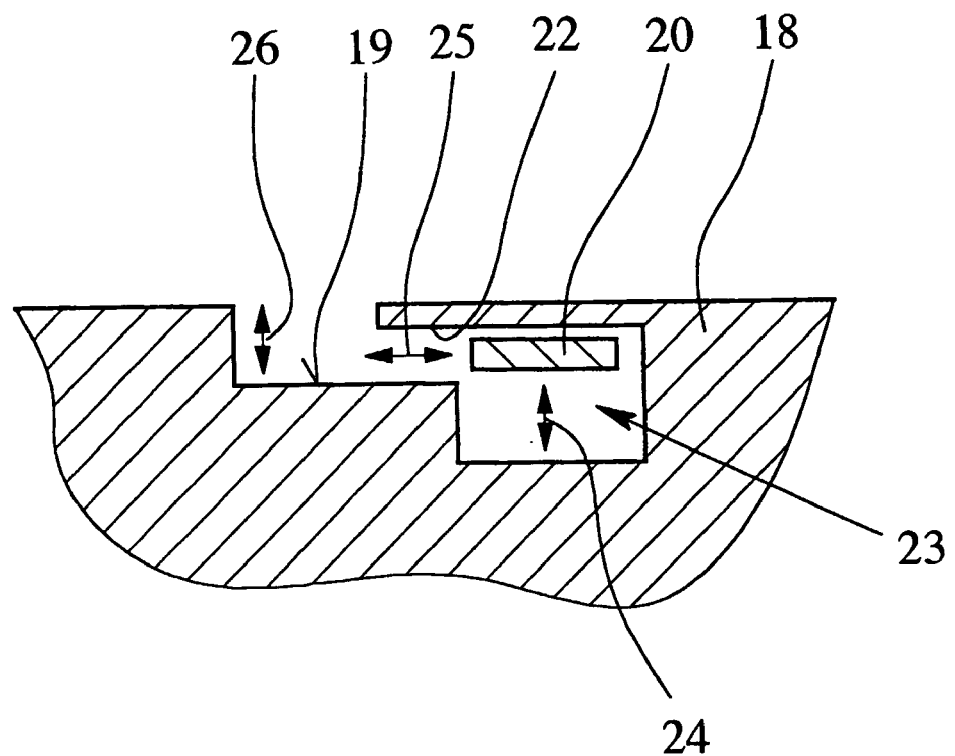
FIG. 7 is a schematic section of a locking means of the discharge device in the intermediate position.

FIG. 7 shows a schematic curved section of a part of the circumferential wall provided by the housing or locking element 18 and illustrates the functioning of the first/second locking means. The housing or locking element 18 comprises a recess 23. The recess 23 is radially open and preferably stepped in circumferential direction forming the first stop 19 and second stop 22. The protruding portion 20 can engage into the recess 23. FIG. 7 represents the intermediate position in the discharge state as shown in FIG. 5. Arrow 24 represents the movement between the intermediate position and the second position in the discharge state. Arrow 25 represents the movement for switching between the discharge state and non-discharge state, i.e., the relative rotation between actuation member 17 and the housing/locking element 18. Arrow 26 represents the movement between the intermediate position and the first position in the non-discharge state.

It is apparent from FIG. 7, that the first stop 19 and the second stop 22 can be bypassed alternately by the rotation, i.e., if the first locking means is locked the second locking means is unlocked and vice versa.

In the present invention, the metered dose valve 2 allows the user to select three positions:
(a) the first position where the inlet valve 7 is open and the outlet valve 8 is closed;
(b) the intermediate position (ready to use position) where both inlet and outlet valves 7, 8 are closed;
(c) the second position where the inlet valve 7 is closed and the outlet valve 8 is open.

The rotating locking mechanism according to the present invention for allowing the proposed function—in particular, the first and/or second stop 19, 22; the first and/or second locking means—may be located within the valve body of the metered dose valve 2 or outside of the valve body.

As already mentioned, the intermediate position and the discharge state may be reached from the first position by depressing, and then, by rotating or twisting the actuation member 17. The second position may be reached from the intermediate position by further depressing the actuation member 17. To refill the metering chamber 6, the user preferably counter rotates the actuation member 17 in the intermediate position into the non-discharge state allowing the spring 15 to return the valve element 5 to the first position shown in FIG. 4. In the first position, the inlet valve 7 is open allowing liquid 4 from the container 3 to enter the metering chamber 6.

In the discharge state, the user has full control over discharging of the contents of the metering chamber 6 by depressing the actuation member 17 from the intermediate position to the second position as many times as it takes to empty the metering chamber 6.

In order to allow easy handling without any stress, the volume of the metering chamber 6 is adapted to the discharge rate preferably such that the time for completely discharging one metered dose of liquid 4 from the chamber 6 exceeds at least 2 seconds, in particular 5 seconds. Preferably, the volume of the metering chamber is about 5 μl to 20 ml, in particular, about 10 to 20 ml.

In order to allow easy handling, the stroke of the actuation member 17/valve element 5 from the first position to the second position in actuation direction should exceed 2 mm, in particular, 5 mm.

It is that also other suitable valve designs can be used, in particular, with regard to the inlet valve 7 and the outlet valve 8.

The discharge device 1 according to the first embodiment is adapted, in particular, for use upside down, i.e., with the discharge outlet or head/actuation member 17 at the lower end. FIGS. 1 to 6 show the discharge device 1 in the upright orientation, but with the liquid 4 already filling the upper part of the container 3 completely as it is the case in the upside down orientation.

In the following, the discharge device 1 according to a second embodiment of the present invention will be described with reference to FIGS. 8 to 10, wherein merely main differences between the second embodiment and the first embodiment will be emphasized.

The discharge device 1/metered dose valve 2 according to the present invention comprises a dip hose 27 connected to the inlet valve 7 of the metered dose valve 2 and a dip tube 28 within the metering chamber 6 and connected to the outlet valve 8. This allows, in particular, upright vertical use, i.e., without inversion of the discharge device 1.

Figure 8:
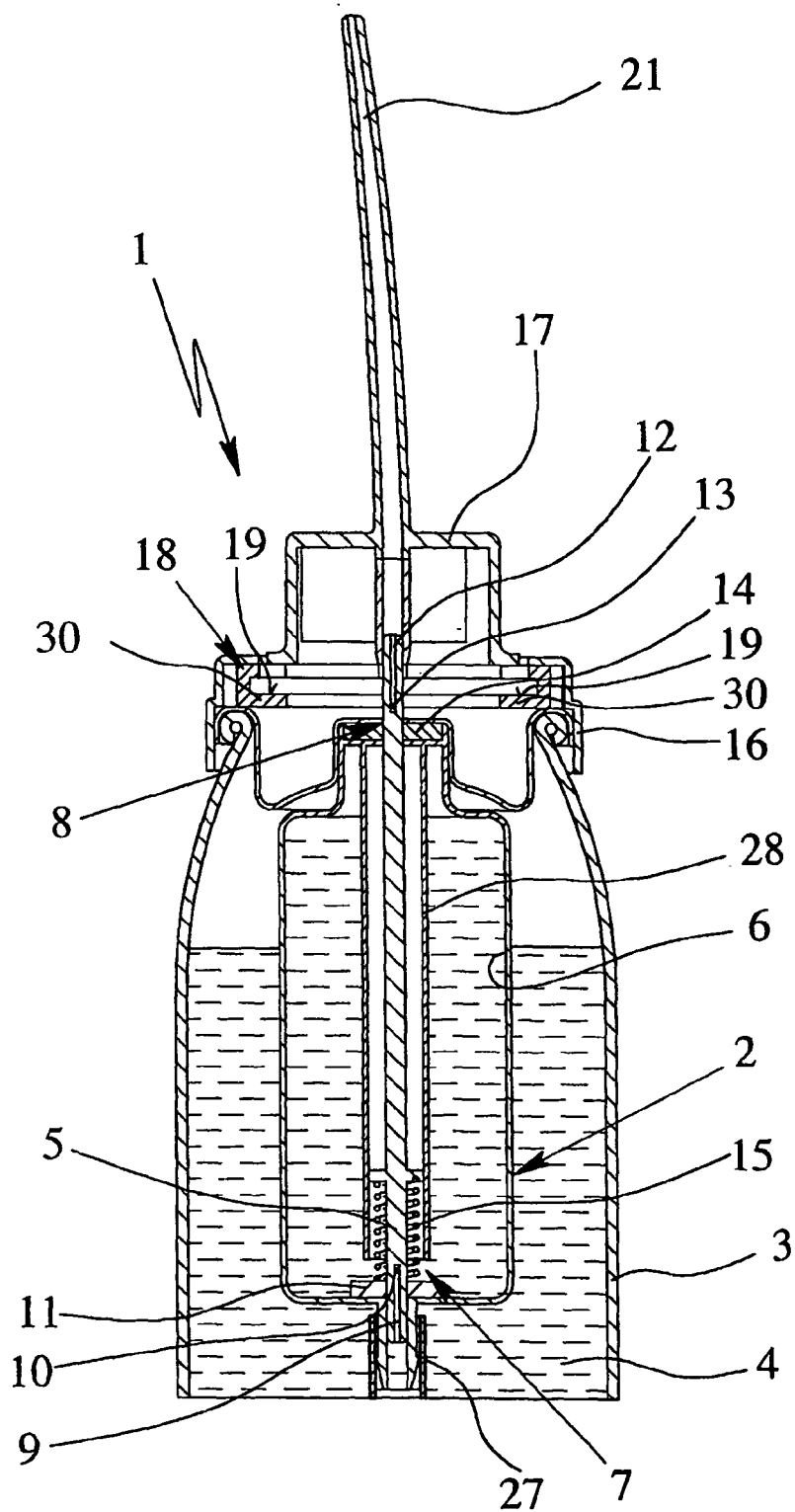
FIG. 8 is a schematic partial section of the discharge device with the metered dose valve according to the second embodiment of the present invention in the first position.

FIG. 8 shows the discharge device 1 in the first position. FIG. 9 shows the discharge device 1 in the discharge state in the intermediate position. FIG. 10 shows the discharge device 1 in the second position, i.e., during discharge of fluid 4.

The operation and function of the discharge device 1 and its metered dose valve 2 according to the second embodiment are basically the same as the ones of the first embodiment. However, the rotating locking mechanism is constructed in a slightly different manner.

The housing/locking element 18 has a ring-like form and is held by the cup 16. In particular, the element 18 comprises an upper ring section 29 and a spaced lower ring section 30 as shown in FIGS. 8 to 10. The first ring section 29 comprises vertical recesses 23 aligned with protruding portions or lugs 20 of the actuation member 17 so that these lugs 20 can pass trough the ring section 29 when depressing the actuation member 17 from the first position into the intermediate position.

In this rotational state (non-discharge state), the lower ring section 30 forms the first stop 19 at which the lugs 20 abut. FIG. 9 shows the discharge device 1 in the intermediate position after twisting the actuation member 17 into the discharge state.

In the discharge state, the upper ring section 29 forms the second stop 22 for the lugs 20 to prevent refilling of the metering chamber 6 that would happen otherwise if the spring 15 could return the valve element 5 into the first position.

Figure 10:
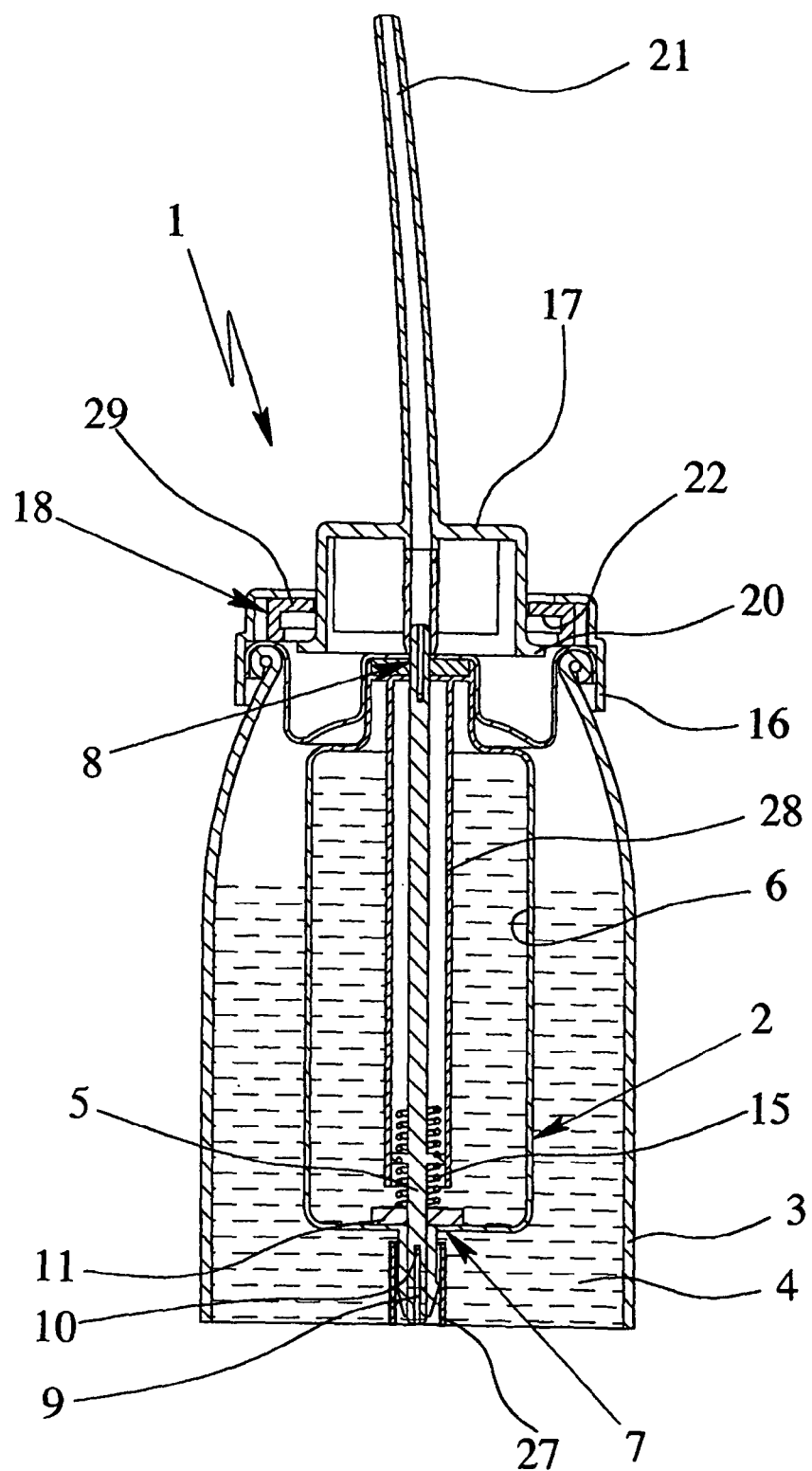
FIG. 10 is a schematic partial section of the discharge device with the metered dose valve according to the second embodiment of the present invention in the second position.

In the discharge state, the lugs 20 are aligned with vertical slits or recesses 23 in the lower ring section 30, so that the lugs 20 can pass through the lower ring section 30 when depressing the actuation member 17 from the intermediate position into the second position shown in FIG. 10 for discharging liquid 4 from the metering chamber 6 through the outlet valve 8 and the outlet channel 21 to the atmosphere. In the second embodiment, the outlet channel 21 is preferably formed by a hose-like protrusion of the actuation member 17 or the like.

Figure 9:
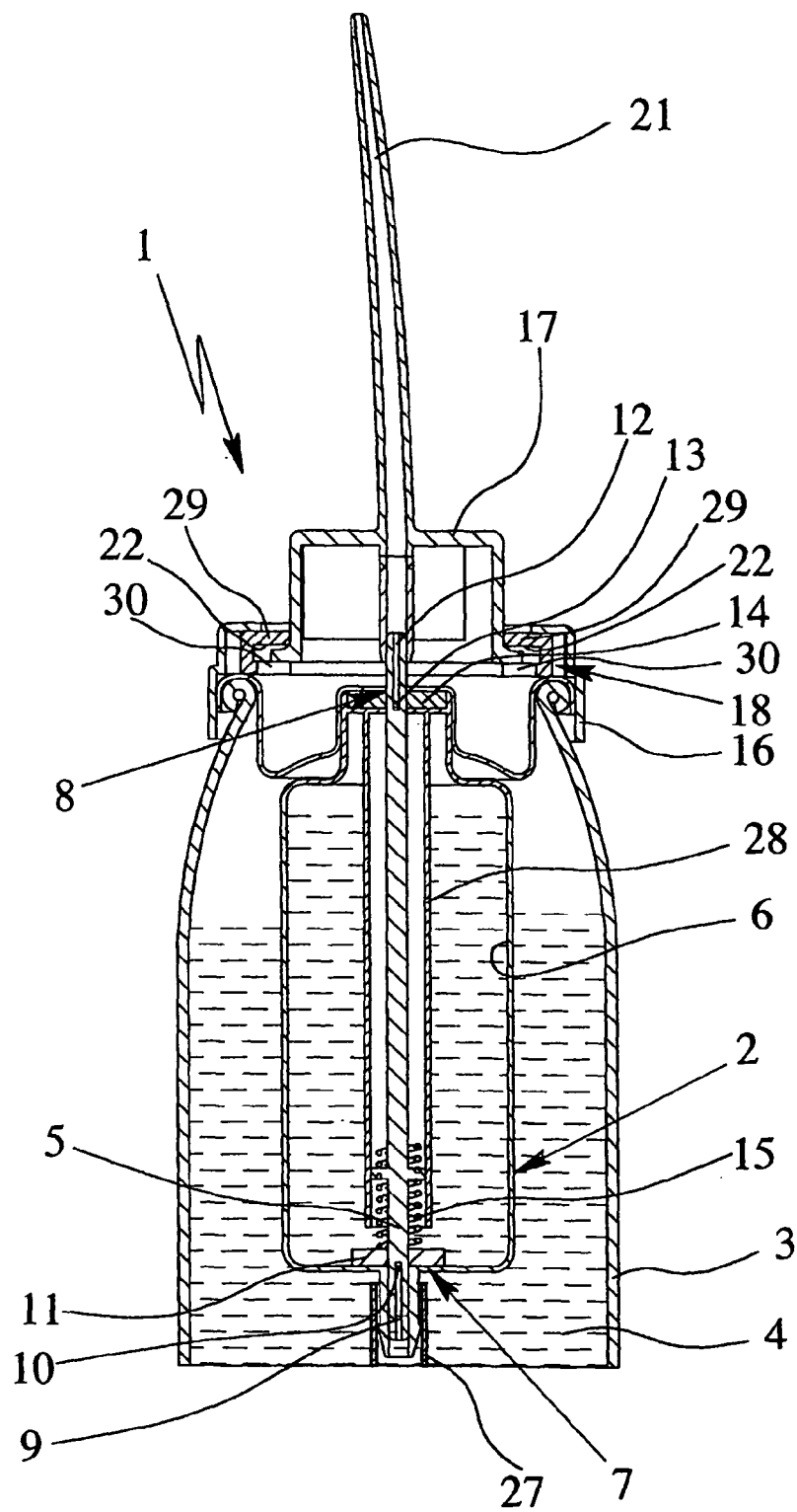
FIG. 9 is a schematic partial section of the discharge device with the metered dose valve according to the second embodiment of the present invention in the intermediate position.

After release of the actuation member 17, the biasing force of spring 15 returns the valve element 5 and actuation member 17 to the intermediate position shown in FIG. 9, and thus, stops discharge of fluid 4 from the metering chamber 6. In this discharge state, the user can depress and release the actuation member 17 as many times as desired to discharge the liquid 4 from the metering chamber 6 discontinuously or in respective steps.

Finally, the actuation member 17 can be twisted back into the non-discharge state. This is possible due to a respective circumferential space for the lugs 20 between the upper ring section 29 and the lower ring section 30. Then, the spring 15 returns the valve element 5 and the actuation member 17 to the first position, and the metering chamber 6 is refilled with liquid 4 from the container 3.

A discharge device with a metered dose valve is proposed in which the valve comprises an inlet valve, a metering chamber and an outlet valve. In order to allow discharge of fluid from the metering chamber in multiple steps, a user can depress and release an actuation member multiple times in a selected discharge state wherein refill of the metering chamber with new liquid is prevented.

The invention claimed is:

1. Discharge device with a metered dose valve for metered discharge of a pressurized liquid, wherein the metered dose valve comprises:
    a single valve element that is movable into three different selectable positions, and
    a metering chamber with an associated inlet valve and an associated outlet valve,
    wherein the outlet valve is closed and the inlet valve is open in a first position of the valve element so that the liquid can fill the metering chamber with a metered dose,
    wherein the outlet valve is open and the inlet valve is closed in a second position of the valve element so that the liquid is discharged from the metering chamber to the atmosphere,
    wherein the inlet valve and the outlet valve are closed in an intermediate position of the valve element,
    wherein the valve element is biased by a spring in a direction toward the first and intermediate positions,
    wherein the valve element is actuatable and movable between the intermediate and the second position enabling a metered dose of the liquid to be discharged discontinuously or by more than one actuation of the valve element, and
    further comprising a settable control arrangement having a dispensing position in which movement of the valve element is possible only between said second position and said intermediate position and a non-dispensing position in which the valve element is movable into the first position.

2. Discharge device according to claim 1, wherein the spring is located within the metering chamber.

3. Discharge device according to claim 1, wherein the valve element is depressible against the biasing force of the spring from the intermediate position into the second position.

4. Discharge device according to claim 1, wherein the metered dose valve is adapted to completely discharge a metered dose of liquid from the metering chamber in the second position in a period of time that exceeds at least 2 seconds.

5. Discharge device according to claim 1, wherein the metered dose valve is movable between a discharge state and a non-discharge state by twisting of an actuation member.

6. Discharge device according to claim 1, wherein the valve element is depressible against the biasing force of the spring from the first position into the intermediate position.

7. Discharge device according to claim 6, wherein a first stop is provided which defines said intermediate position and wherein the valve element is depressible until the first stop is reached.

8. Discharge device according to claim 1, wherein the settable control arrangement comprises a first locking means for selectively locking valve actuation or movement from the intermediate position into the second position.

9. Discharge device according to claim 8, wherein the first locking means comprises a first stop which defines said intermediate position.

10. Discharge device according to claim 8, wherein at least one of the valve element, an actuation member associated with the valve element and a locking element is rotatable for locking and unlocking the first locking means.

11. Discharge device according to claim 8, wherein the settable control arrangement further comprises a second locking means for selectively locking valve actuation or movement from the intermediate position into the first position.

12. Discharge device according to claim 11, wherein the first locking means comprises a first stop which defines said intermediate position and wherein the second locking means forms a second stop preventing movement of the valve element from the intermediate position into the first position due by a a biasing force of the spring, when the second locking means is locked.

13. Discharge device according to claim 11, wherein at least one of the valve element, an actuation member associated with the valve element and a locking element is rotatable for locking and unlocking the second locking means.

14. Discharge device according to claim 11, wherein the first locking means is adapted to be unlocked when the second locking means is locked and vice versa.

15. Discharge device according to claim 11, further comprising an actuation member associated with the valve element, wherein the actuation member comprises a portion engageable into a recess for forming at least one of the first and second locking means.

\* \* \* \* \*